Sept. 22, 1964  R. M. GITLIN ETAL  3,149,482
ANGULAR ERROR COMPENSATING DEVICE
Filed May 25, 1962  2 Sheets-Sheet 1

INVENTORS
ROBERT M. GITLIN
RICHARD L. MULLER
BY

ATTORNEYS

Sept. 22, 1964   R. M. GITLIN ETAL   3,149,482
ANGULAR ERROR COMPENSATING DEVICE
Filed May 25, 1962   2 Sheets-Sheet 2

INVENTORS
ROBERT M. GITLIN
RICHARD L. MULLER
BY
Kane, Dalsimer and Kane
ATTORNEYS

United States Patent Office 3,149,482
Patented Sept. 22, 1964

3,149,482
ANGULAR ERROR COMPENSATING DEVICE
Robert M. Gitlin, East Meadow, and Richard L. Muller, Mineola, N.Y., assignors to American Aerospace Controls, Inc., Farmingdale, N.Y., a corporation of New York
Filed May 25, 1962, Ser. No. 197,720
1 Claim. (Cl. 64—24)

This invention relates generally to compensating devices and more particularly to a mechanical device for compensating for repeatable angular errors in a servo system.

In "follow-up" systems such as servo systems wherein rotating components are used, many errors occur which are repeatable and predictable. Various devices have been designed for use in these systems to correct or compensate for these errors. For the most part these devices have been cumbersome and unreliable.

This invention herein disclosed has as its principal object the provision of a unique mechanical angular error compensating device to be used in measurement, control and computing equipment to correct for inaccuracies, such as repeatable angular position errors, design parameter uncertainties, time associated system changes in potentiometer loading errors.

It is another object of the invention to provide an angular error compensating device which is suitable for limited space applications and which can be adjusted over a range of 360° by radial access.

It is still another object of the invention to provide an angular error compensating device which can be utilized as a standard component, and which can be provided for mechanical or electrical output.

It is a further object of this invention to provide an angular error compensating device having concentric input and output shafts which can be used in a syncro mounting.

An angular error compensating device embodying the invention and the manner of using the same is described herein with references to the drawings in which.

Figure 1:
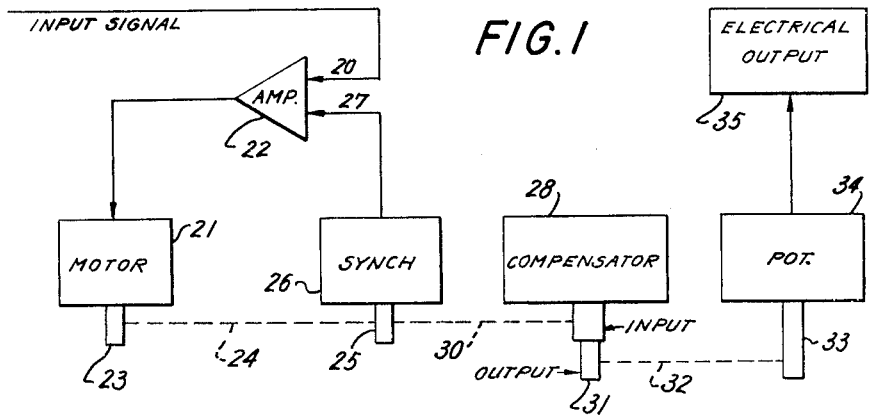
FIG. 1 is a diagrammatic representation of a typical servo system utilizing an angular error compensating device.

In FIG. 1 a portion of a typical servo system utilizing the invention is illustrated. In the figure an electrical input signal 20 is shown driving a motor 21 through amplifier 22 and the output shaft 23 of the motor is coupled through gearing 24 to the shaft 25 of syncro 26. An electrical output 27 is taken from syncro 26 and fed back to the input of the system through amplifier 22 as is typical in systems of this type. With such an arrangement as that shown in FIG. 1 and thus far described imperfections in the syncro due to manufacture result in a ratio between syncro input and syncro output which may vary according to the position of the rotating portion of the syncro. Each syncro has a repeatable error built into it which depends upon the position that the syncro rotating component has. Thus, if a syncro such as 26 is calibrated to give an electrical output signal X when the rotating component is at the 0° position, multiplying the shaft position by a factor of N will not automatically multiply the output electrical signal X by a factor of N even though the calibrated ratio is fixed. This is a direct result of a position error. Most systems of this type contain position sensitive components. The error thus introduced is repeatable over 360° of rotation of the syncro shaft. In order to correct for this error and enable proper calibration of the system, compensator 28 is provided. Input shaft 29 of compensator 28 is mechanically coupled to shaft 25 of syncro 26 through coupling 30 and the output shaft 31 is linked through mechanical coupling 32 to shaft 33 of potentiometer 34 which provides an electrical output 35. In a system such as that shown in FIG. 1 the electrical output 35 rather than electrical output 27 would be fed back into amplifier 22 to close the loop.

Figure 2:
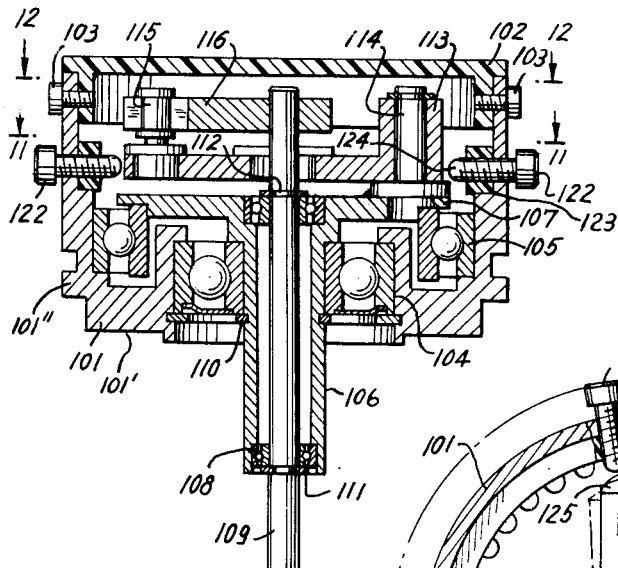
FIG. 2 is a longitudinal sectional view of an alternate form of angular error compensating device constructed in accordance with the teachings of this invention.

An angular error compensating device constructed in accordance with the teachings of this invention is shown in FIGS. 2 through 5. The compensating device is provided with a substantially cylindrical casing or housing formed of anodized aluminum such as is standard in the art for rotating components and is provided with concentric input and output shafts extending from the components mounting face 101'. The input and output shafts are indicated in the figures by the numerals 106 and 109 respectively. The device is designed to be mounted on a gear plate in a manner similar to that used for other rotating components and can be mounted with a servo clamp or screw mounting. As shown in FIG. 2 the casing is provided with mounting ring 101" for clamp mounting.

Figure 3:
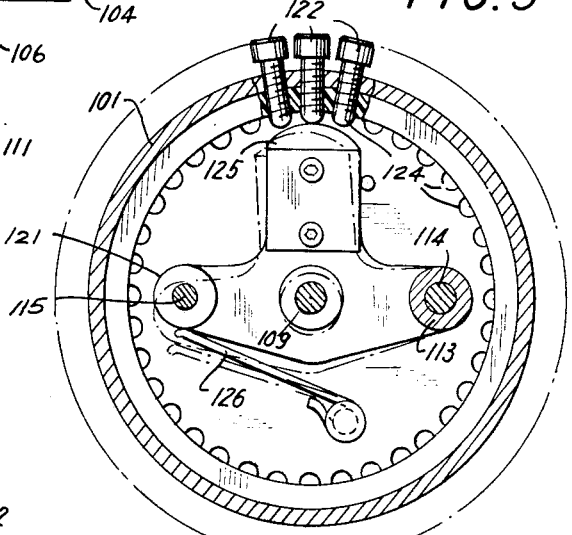
FIG. 3 is a sectional view taken along the line 11—11 in the direction of the arrows as indicated in FIG. 2.
Figure 4:
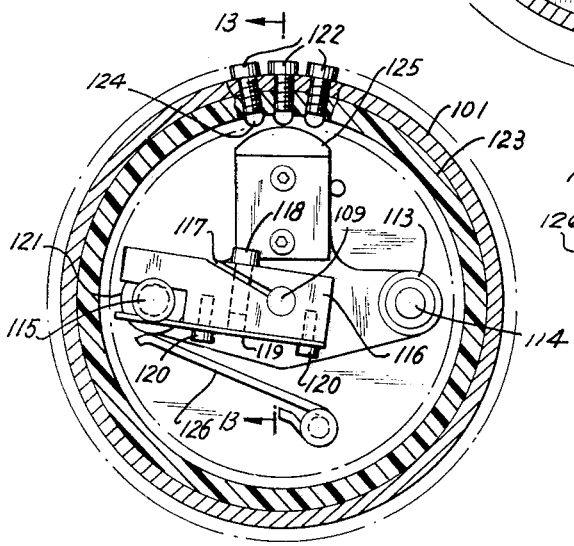
FIG. 4 is a sectional view taken along the line 12—12 in the direction of the arrows as indicated in FIG. 2.
Figure 5:
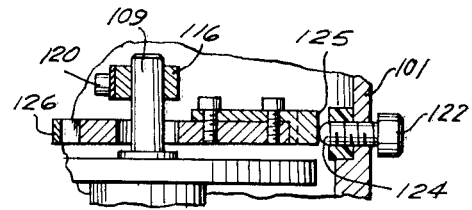
FIG. 5 is a segmentary sectional view taken along the line 13—13 in the direction of the arrows as indicated in FIG. 4.

In FIG. 2 a cross-sectional view of the device is shown in which housing 101 with cap 102 held in position by screws 103 supports bearings 104 and 105. Input shaft 106 is provided with a dislike upper flange 107 and is supported in the housing by bearings 104 and 105. Shaft 106 supports bearings 107 and 108 allowing for concentric mounting of output shaft 109. Shaft 106 is maintained in position axially relative to the housing by retainer 110 and the race of bearing 105. Shaft 109 is maintained in axial alignment by retainers 111 and 112. The disk 107 of the input shaft is pivotally connected to coupling member 113 by means of pin 114 and coupling member 113 supports pin 115 which is coupled to coupling member 116 which is clamped to the upper end of output shaft 109 by means of slot 117 in the body thereof and screw 118. Spring 119 is fastened to coupling member 116 by screws 120 and provides a wall for maintaining the upper end of pin 115 in the slot 121 formed by spring 119 and the body of coupling member 116. Thus, in the embodiment of the invention set forth in FIGS. 10 through 13, the input shaft 106 is coupled to the output shaft 109 through disk 107, pin 114, coupling member 113, pin 115 and coupling member 116. A plurality of screw members 122 are threaded radially through housing 101 in the same plane and pass through Teflon strip 123 so that the rounded ends 124 of each of the screws 122 is exposed. Arcuate surface 125 is formed on coupling member 113 and is of such radius so as to engage one or more ends 124 of screws 122. In FIG. 3 three screws 122 are shown with the ends 124 thereof adjacent arcuate surface 125. The ends 124 of the plurality of screws 122 provide a track upon which arcuate surface 125 travels when the input shaft is rotated. Spring 126 continually yieldingly urges arcuate surface 125 against the track formed by the plurality of ends 124. Teflon strip 123 serves to maintain screws 122 in position and the spring 119 engaging the upper end of pin 115 provides an anti-backlash feature.

The operation of the device will now be considered with reference to the description above. Rotation of input shaft 106 in the combination is transmitted to coupling member 113 through pin 114 and is further transmitted to coupling member 116 through pin 115. Rotation of coupling member 116 results in the rotation of output shaft 109 since it is rigidly clamped in slot 117 of coupling member 116 and cannot rotate with respect thereto. Thus, rotation of shaft 106 is transmitted to shaft 109 through coupling members 113 and 116.

Rotation of shaft 106 resulting in rotation of coupling member 113 causes arcuate surface 125 to ride on ends 124 of screws 122 which provides a track for movement thereof. The arcuate surface 125 is continually pressed against the end 124 by spring 126. If the track provided by ends 124 is in the form of a perfect circle, then the rotational movement of shaft 106 will be accurately transmitted to coupling member 116, however, if there are deformities in the track, the rotational movement of shaft 106, which is transmitted to coupling member 116, will be modified or altered. The rotational movement of shaft 109 therefore, is a combination of the rotational movement of shaft 106 and the uniformity of configuration of track provided by ends 124 of screws 122. If the track is perfectly regular or a perfect circle the relationship between the input and output shafts can be made one to one. If however, the track is modified in configuration so that there are irregularities upon it, the one to one ratio of input to output is upset and modified. Thus, the ratio of input to output shaft can be modified or changed at any desired angle over the 360° angle of rotation of the input and output shafts. With such an arrangement repeatable errors resulting from the shaft position of the syncro 26 in FIG. 1 can be compensated for by simply adjusting the plurality of screws 122 to modify the coupling between the input and output shafts of the angular error compensating device so that the system is free of position errors.

If it is desired, a potentiometer can be provided and mounted on the angular error compensating device with the potentiometer shaft being the output shaft of the compensating device. Thus, the compensating device would provide an electrical output without the necessity of coupling a potentiometer to the mechanical output shaft.

The angular error compensating device disclosed in the figures and described above provides in its various embodiments a reliable device for use in correction of angular positional errors in a system utilizing rotating components.

Thus, among others, the several objects in the invention as specifically aforenoted, are achieved. Obviously, numerous changes in construction and re-arrangement of parts might be resorted to without departing from the spirt of the invention as defined by the claim.

We claim:

An angular error compensating device including in combination a housing, a rotatable input shaft, a rotatable output shaft, a first coupling member pivotally connected to said input shaft, a second coupling member rigidly attached to said output shaft, means pivotally connecting said coupling members, a cam follower surface formed on said first coupling member, a plurality of independently radially adjustable screw members radially disposed about the axis of said input shaft, a cam surface formed on each of said screw members, a track provided by said cam surfaces, and means yieldingly urging said cam follower surface adjacent said track.

References Cited in the file of this patent

UNITED STATES PATENTS

| | | |
|---|---|---|
| 2,589,852 | Overacker | Mar. 18, 1952 |
| 2,590,287 | Brelsford | Mar. 25, 1952 |
| 2,741,900 | Beishline et al. | Apr. 17, 1956 |
| 2,826,082 | Ranson | Mar. 11, 1958 |
| 2,899,831 | Haverland | Aug. 18, 1959 |